United States Patent [19]

Minnick

[11] Patent Number: 5,506,014
[45] Date of Patent: Apr. 9, 1996

[54] PET COPOLYESTERS CONTAINING SUCCINIC AND NAPHTHALENEDICARBOXYLIC ACID MOIETIES HAVING IMPROVED BARRIER PROPERTIES

[75] Inventor: Larry A. Minnick, Bluff City, Tenn.

[73] Assignee: Eastman Chemical Company, Kingsport, Tenn.

[21] Appl. No.: 522,882

[22] Filed: Sep. 1, 1995

[51] Int. Cl.$^6$ .............................. B32B 1/08; C08G 63/16
[52] U.S. Cl. .................. 428/35.7; 528/272; 528/298; 528/300; 528/302; 528/307; 528/308; 528/308.6; 428/34.1; 428/35.2; 428/98
[58] Field of Search ...................... 528/272, 298, 528/300, 302, 307, 308, 308.6; 428/34.1, 35.2, 35.7, 98

[56] References Cited

U.S. PATENT DOCUMENTS

| | | | |
|---|---|---|---|
| 4,401,805 | 8/1983 | Weemes et al. | 528/302 |
| 5,302,686 | 4/1994 | Tanaka et al. | 428/35.7 |
| 5,403,897 | 4/1995 | Ebato et al. | 525/444 |
| 5,439,987 | 8/1995 | Scott et al. | 525/425 |

OTHER PUBLICATIONS

Research Disclosure No. 36009, "Fabrication of Blood Tubes With Improved Shelf–life From Selected Polyesters, Copolyesters, and Polyester Blends by Injection Molding", Apr., 1994.

Research Disclosure No. 36903, "Fabrication of Blood Tubes with Improved Shelf–life from Selected Copolyesters and Terepolyesters by Injection Molding", Jan., 1995.

Research Disclosure No. 29484, "Poly(Ethylene 2,6–Naphthalene dicarboxylate) Copolyesters", Oct., 1988.

*Primary Examiner*—Samuel A. Acquah
*Attorney, Agent, or Firm*—Karen A. Harding; Harry J. Gwinnell

[57] ABSTRACT

Disclosed are terpolymers having improved barrier properties and tensile strength relative to PET comprising copolyesters derived from acid components comprising about 45 to about 85 mol % terephthalic acid; about 10 to about 40 mol % of at least one naphthalenedicarboxylic acid and about 5 to about 15 mol % of at least one aliphatic dicarboxylic acid having 1 to 6 carbon atoms and glycol component comprising ethylene glycol. The copolyesters of the present invention may be formed into a variety of articles such as blood tubes, serum vials, containers, films and sheeting.

18 Claims, No Drawings

PET COPOLYESTERS CONTAINING SUCCINIC AND NAPHTHALENEDICARBOXYLIC ACID MOIETIES HAVING IMPROVED BARRIER PROPERTIES

PET is currently useful for the fabrication of injection molded vacuum blood tubes. PET has good gas barrier properties and as a result blood tubes prepared from the resin have adequate retention of vacuum for selected applications. However, improved gas barrier properties are desirable to extend the shelf life of these tubes in selected applications. Copolyesters of polyethylene terephthalate (PET), naphthalenedicarboxylic acid and at least one aliphatic dicarboxylic acid have been found to possess improved gas barrier properties relative to PET. Surprisingly these copolyesters also maintain the heat resistance and impact properties of PET.

BACKGROUND OF THE INVENTION

Blood tubes for the medical industry have traditionally been prepared from glass. In recent years, the possibility of infectious disease being spread by contact with blood from broken tubes has caused the medical industry to increasingly depend on plastic tubes. Tubes are now being prepared from injection molded resins such as PET. These tubes are prepared and maintained under reduced pressure to allow for a convenient method for the sampling of blood. Because of the need to maintain reduced pressure in these tubes, there is a need for resins that will provide improved barrier properties relative to PET and therefore, give the extended shelf-life needed in selected applications.

Poly(ethylene-2,6-naphthalenedicarboxylate) (PEN) displays improved barrier properties relative to PET. However, this resin is quite expensive and due to the increased melting point and melt viscosity requires very high processing temperatures relative to PET.

U.S. Pat. No. 4,401,805 describes PET copolyesters containing 1–45 mol % of aliphatic dicarboxylic acids containing 3 to 8 carbon atoms which are reported to have good barrier properties. However, the addition of only aliphatic dicarboxylic acids lowers the heat resistance properties of the resultant polyester relative to those of PET. The addition of aromatic dicarboxylic acids other than terephthalic acid is not disclosed.

Research Disclosure No. 36009 (April, 1994) describes PET copolyesters containing either 10–50 mol % isophthalic acid, or 10–30 mol % of either succinic acid, glutaric acid, adipic acid, or mixtures of these aliphatic acids. These copolyesters are reported to be useful for the preparation of blood tubes.

Research Disclosure No. 36903 (January, 1995) discloses PET copolyesters containing glutarate, succinate, adipate or mixutures thereof that are reported to have improved shelf-life in blood tubes. Terpolymers of PET, isophthalic and naphthalenedicarboxylic acids are also disclosed.

Research Disclosure No. 29484 (October, 1988) discloses various PEN copolyesters.

DESCRIPTION OF THE INVENTION

The present invention provides novel copolyesters derived from acid components comprising about 45 to about 85 mol % terephthalic acid; about 10 to about 40 mol % of at least one naphthalenedicarboxylic acid and about 5 to about 15 mol % of at least one aliphatic dicarboxylic acid having 2 to 8 carbon atoms and glycol component comprising ethylene glycol. Injection molded, blow molded and extruded articles made therefrom are also disclosed. Preferably said copolyesters comprise 60 to about 75 mole % terephthalic acid; about 20 to about 30 mole % of at least one naphthalenedicarboxylic acid and about 5 to about 10 mole % of said at least one aliphatic dicarboxylic acid.

The naphthalenedicarboxylic acid isomer is selected from 1,4-, 1,5-, 2,6-, 2,7-, 1,2-, 1,3-, 1,7-, 1,8-, 2,3-, 2,4-, 2,5-, and 2,8-naphthalenedicarboxylic acid isomers. Mixtures of the various isomers may also be used. The isomer(s) chosen may be added to the reaction as either an acid or an ester. Preferably, the naphthalenedicarboxylic acid is 2,6-naphthalene-dicarboxylic acid isomer.

The aliphatic dicarboxylic acid is preferably selected from oxalic, succinic, malonic, glutaric, adipic, 1,4-cyclohexanedicarboxylic acid and the like. More preferably the aliphatic dicarboxylic acid is selected from succinic, glutaric and adipic acid, and most preferably is succinic acid.

The copolyesters are readily prepared by either batch or continuous polycondensation processes well known to those skilled in the art. The dicarboxylic acid moieties may be derived from the acids or their lower alkyl esters, such as the dimethyl esters. Useful copolyesters will have inherent viscosity (IV) values of about 0.4 to about 1.1.

Typical catalysts which may be used in the polymerization of these copolyesters include the titanium alkoxides, dibutyl tin laurate, combinations of zinc, manganese, or magnesium acetates or benzoates with antimony oxide or antimony triacetate.

In general, up to about 20 mol % of other aliphatic and aromatic diols can be used to prepare the polyesters as long as about 80 mol % is ethylene glycol. Examples of such diols include propylene glycol; diethylene glycol; 1,2-propylene glycol; 2,4-dimethyl-2-ethyl-hexane-1,3-diol; 2,2,4-trimethyl-1,3-pentanediol; 2,2-dimethyl-1,3-propanediol; 2-ethyl-2-butyl- 1,3-propanediol; 2,2-diethyl-1,3-propanediol; 2-methyl- 2-propyl-1,3-propanediol; 2-ethyl-2-isobutyl- 1,3-propanediol; 1,3-butanediol; 1,4-butanediol; 1,5-pentanediol; 1,6-hexanediol; 2,2,4-trimethyl- 1,6-hexanediol, 1,2-cyclohexanedimethanol; 1,3-cyclohexanedimethanol; 2,2,4,4-tetramethyl- 1,3-cyclobutanediol; 0-, m-, and p-xylylene diols; 4,4'-sulfonyldiphenol; 4,4'-oxydiphenol; 4,4'-isopropylidenediphenol; and 2,5'-naphthalenediol.

The compositions of the present invention have excellent barrier properties and are readily processable at temperature ranges similar to PET. For example, such copolyesters can be injection molded into blood tubes, serum vials, laboratory bottles and the like at temperatures ranging from about 250° C. to about 280° C. The copolyesters may also be formed into a variety of other articles such as containers, films and sheets by well known molding techniques such as injection molding, extrusion blow molding, extrusion molding and extrusion stretch molding. The heat deflection temperature and other elevated temperature properties of these copolyesters are at least equal to PET.

Moreover, the copolyesters of the present invention are clear. Clarity is essential in several applications, including blood tubes.

Small amounts of other ingredients may be added to the composition of the present invention to enhance their performance properties. For example, lubricants, stabilizers, antioxidants, ultraviolet light absorbing agents, mold release agents, metal deactivators, zeolites, fillers, and the like can be used so long as they do not hinder the present invention from accomplishing the objective.

EXAMPLES

The polyesters and copolyesters made in the Examples were extruded into thin film (nominally 10 mil) using a ¾ inch Killion single screw extruder for use in permeability testing. These materials were also molded into tensile and flexural bars using a Toyo 90 injection molding machine for use in mechanical property testing. Inherent viscosity (I.V.) was measured at 25° C. using 0.5 gram of polyester per 100 ml of a solvent consisting of 60 wt % phenol and 40 wt % tetrachloroethane.

Examples 1-5

Polyesters of terephthalic acid (T), 2,6-naphthalenedicarboxylic acid (N), succinic acid (S) and ethylene glycol (EG) as listed in Table 1 were prepared via polycondensation as follows. An excess of ethylene glycol was reacted with the listed acid components at about 200° to 220° C. to remove water and methanol from the reaction mixture. The dimethylester of terephthalic acid and naphthlenedicarboxylic acid were used. Succinic acid was used in its acid form. Polymerization was conducted under reduced pressure at 285° C.

TABLE 1

| Ex. # | mole % T | mole % N | mole % S | mole % EG |
|---|---|---|---|---|
| 1 | 100 | — | — | 100 |
| 2 | 50 | 50 | — | 100 |
| 3 | 85 | — | 15 | 100 |
| 4 | 75 | 20 | 5 | 100 |
| 5 | 60 | 25 | 15 | 100 |

The properties of the resultant polyesters were measures as follows: I.V.s (described above), oxygen transmission rates (ASTM D3985), toughness (tensile elongation to break - ASTM D638) and heat of deflection termperatures (HDTs - ASTM D648) and are shown in Table 2, below.

TABLE 2

| Ex # | IV | Permeabilty (cc-mil/ 100 in$^2$-24 hr-atm) | % tensile elong. to break | HDT (C. @ 66/264 psi) |
|---|---|---|---|---|
| 1 | 0.56 | 12.6 | 95 | 70/63 |
| 2 | 0.61 | 6.9 | 8 | 86/73 |
| 3 | 0.55 | 7 | 257 | 56/51 |
| 4 | 0.66 | 8.3 | 258 | 73/65 |
| 5 | 0.72 | 6.6 | 86 | 63/60 |

These examples show that the gas barrier properties of PET can be improved significantly by the addition of the combination of succinic and 2,6-naphthalenedicarboxylic acids. Surprisingly, these improvements can be obtained without the detrimental effects of lowered toughness and increased melt viscosity that is obtained in PET containing only 2,6-naphthalenedicarboxylic acid (>50 mol %). Also, these improvements can be obtained without the detrimental effects of lowered HDT that is obtained in PET containing only succinic acid.

We claim:

1. A copolyester derived from acid components comprising about 45 to about 85 mol % terephthalic acid; about 10 to about 40 mol % of at least one naphthalenedicarboxylic acid and about 5 to about 15 mol % of at least one aliphatic dicarboxylic acid having 2 to 8 carbon atoms and glycol component comprising ethylene glycol.

2. The copolyester of claim 1 wherein said acid components comprise 60 to about 75 mole % terephthalic acid; about 20 to about 30 mole % of at least one naphthalenedicarboxylic acid and about 5 to about 10 mole % of said at least one aliphatic dicarboxylic acid.

3. The copolyester of claim 1 wherein said naphthalenedicarboxylic acid is selected from the group consisting of 1,4-, 1,5-, 2,6-, 2,7-, 1,2-, 1,3-, 1,7-, 1,8-, 2,3-, 2,4-, 2,5-, 2,8-naphthalenedicarboxylic acid and mixtures thereof.

4. The copolyester of claim 1 wherein said aliphatic dicarboxylic acid is selected from the group consisting of succinic acid, malonic acid, glutaric acid, adipic acid and 1,4-cyclohexanedicarboxylic acid.

5. The copolyester of claim 1 wherein said aliphatic dicarboxylic acid is selected from the group consisting of oxalic, succinic, glutaric and adipic acid.

6. The copolyester of claim 4 wherein said aliphatic dicarboxylic acid is succinic acid.

7. The copolyesters of claim 1 wherein said glycol component further comprises up to about 20 mol % of at least one second glycol.

8. The copolyester of claim 7 wherein said second glycol is selected from the group consisting of propylene glycol; diethylene glycol; 2,4-dimethyl-2-ethyl-hexane-1,3-diol; 2,2,4-trimethyl-1,3-pentanediol; 2,2-dimethyl- 1,3-propanediol; 2-ethyl-2-butyl-1,3-propanediol; 2,2-diethyl-1,3-propanediol; 2-methyl-2-propyl- 1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol, 1,2-cyclohexanedimethanol; 1,3-cyclohexanedimethanol; 2,2,4,4-tetramethyl-1,3-cyclobutanediol; 0-, m-, and p-xylylene diols; 4,4'-sulfonyldiphenol; 4,4'-oxydiphenol; 4,4'-isopropylidenediphenol; and 2,5'-naphthalenediol.

9. The copolyester of claim 1 wherein said copolyesters consist essentially of said acid components and glycol components.

10. A formed article comprising a copolyester derived from acid components comprising about 45 to about 85 mol % terephthalic acid; about 10 to about 40 mol % of at least one naphthalenedicarboxylic acid and about 5 to about 15 mol % of at least one aliphatic dicarboxylic acid having 2 to 8 carbon atoms and glycol component comprising ethylene glycol.

11. The article of claim 10 wherein said acid components comprise 60 to about 75 mole % terephthalic acid; about 20 to about 30 mole % of at least one naphthalenedicarboxylic acid and about 5 to about 10 mole % of said at least one aliphatic dicarboxylic acid.

12. The article of claim 10 wherein said naphthalenedicarboxylic acid is selected from the group consisting of 1,4-, 1,5-, 2,6-, 2,7-, 1,2-, 1,3-, 1,7-, 1,8-, 2,3-, 2,4-, 2,5-, 2,8-naphthalenedicarboxylic acid and mixtures thereof.

13. The article of claim 10 wherein said aliphatic dicarboxylic acid is selected from the group consisting of oxalic acid, succinic acid, malonic acid, glutaric acid, adipic acid and 1,4-cyclohexanedicarboxylic acid.

14. The copolyester of claim 13 wherein said aliphatic dicarboxylic acid is selected from the group consisting of succinic, glutaric and adipic acid.

15. The article of claim 14 wherein said aliphatic dicarboxylic acid is succinic acid.

16. The article of claim 14 wherein said glycol component further comprises up to about 20 mol % of at least one second glycol.

17. The article of claim 16 wherein said second glycol is selected from the group consisting of propylene glycol; diethylene glycol; 1,2-propylene glycol; 2,4-dimethyl-2-ethyl-hexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol, 1,2-cyclohexanedimethanol; 1,3-cyclohexanedimethanol; 2,2,4,4-tetramethyl-1,3-cyclobutanediol; 0-, m-, and p-xylylene diols; 4,4'-sulfonyldiphenol; 4,4'-oxydiphenol; 4,4'-isopropylidenediphenol; and 2,5'-naphthalenediol.

18. The article of claim 10 wherein said article is selected from the group consisting of blood tubes, serum vials, laboratory bottles, containers, films and sheeting.

* * * * *